United States Patent [19]

Jachmann et al.

[11] Patent Number: 4,853,952
[45] Date of Patent: Aug. 1, 1989

[54] METHOD AND APPARATUS FOR VISUAL INDICATION OF STORED VOICE SIGNALS

[75] Inventors: Emil F. Jachmann, Greenwich; Jeremy Saltzman, Norwalk; David B. Chamberlin, Monroe, all of Conn.

[73] Assignee: Dictaphone Corporation, Stratford, Conn.

[21] Appl. No.: 128,254

[22] Filed: Dec. 3, 1987

[51] Int. Cl.⁴ .................. H04M 3/50; H04M 11/00
[52] U.S. Cl. ...................................... 379/88; 379/89; 379/94; 379/96
[58] Field of Search .............. 379/89, 88, 67, 94, 379/96

[56] References Cited

U.S. PATENT DOCUMENTS

| | | | |
|---|---|---|---|
| 3,648,249 | 3/1972 | Goldsberry | 340/709 |
| 3,980,994 | 9/1976 | Ying | 364/200 |
| 4,375,083 | 2/1983 | Maxemchuk | 364/900 |
| 4,380,009 | 4/1983 | Long et al. | 340/825.55 |
| 4,468,813 | 8/1984 | Burke | 455/38 |
| 4,477,807 | 10/1984 | Nakajima et al. | 340/825.44 |
| 4,524,244 | 6/1985 | Faggin | 379/93 |
| 4,582,957 | 4/1986 | Hayes et al. | 379/74 |
| 4,612,416 | 9/1986 | Emerson et al. | 379/88 |
| 4,625,081 | 11/1986 | Lotito et al. | 379/88 |

FOREIGN PATENT DOCUMENTS

| | | | |
|---|---|---|---|
| 0196781 | 10/1986 | European Pat. Off. | 379/89 |
| 3221683 | 12/1983 | Fed. Rep. of Germany | 379/100 |
| 3239881 | 4/1984 | Fed. Rep. of Germany | 379/88 |
| 0202156 | 12/1982 | Japan | 379/67 |
| 0157247 | 9/1983 | Japan | 379/89 |
| 0105748 | 6/1984 | Japan | 379/89 |

OTHER PUBLICATIONS

"The Zymacom Office Server", Zymacom, Inc. product brochure, 9 pages, 1985.

Primary Examiner—Thomas W. Brown
Attorney, Agent, or Firm—Robert H. Whisker; Melvin J. Scolnick; David E. Pitchenik

[57] ABSTRACT

A system for storage and forwarding of voice signals. The system includes apparatus for storage and retrieval of voice signals and telephone-like station sets for access to the stored signals. The station sets also include a display and the system transmits text messages corresponding to various stored signals to the station sets corresponding to the addressees of the various stored signals to inform the addressees that they have messages waiting. In one embodiment the text messages identify the originator or class of the voice signals. In another embodiment the station set will respond to an input by a user to automatically contact the apparatus for storage and retrieval of voice signals to retrieve a stored voice signal corresponding to a displayed text message.

50 Claims, 12 Drawing Sheets

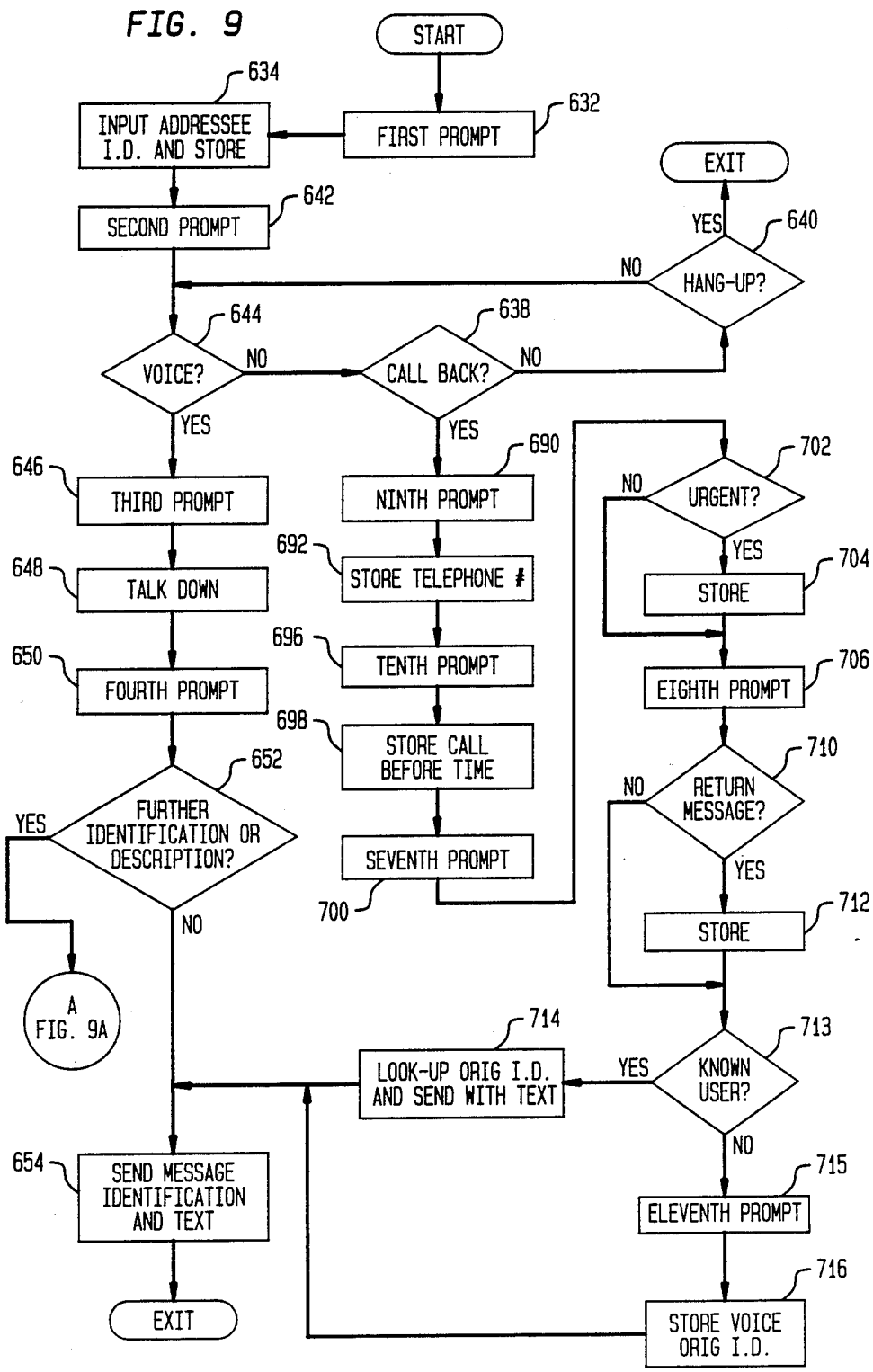

METHOD AND APPARATUS FOR VISUAL INDICATION OF STORED VOICE SIGNALS

BACKGROUND OF THE INVENTION

1. Field of the Invention

This invention relates to systems for storage and forwarding of voice signals, commonly known as voice mail systems. More particularly, it relates to voice mail systems which are particularly adapted for use with small groups of interconnected telephone-like devices (hereinafter referred to as "stations") which include the capability of displaying text messages, autodialing of pre-programmed telephone numbers, and other well known capabilities of "smart phones".

Voice mail systems are well known. Typical of such systems are the systems described in commonly assigned U.S. patent applications numbers 013,303 and 013,304; both by A. Sweet et al., or those described in U.S. Pats. Nos. 4,371,752; 4,580,012; 4,581,486; 4,602,129; 4,640,991; 4,585,406; 4,652,200; and 4,580,016; all assigned to VMX, Inc. While such system vary in capacity, and in particular capabilities offered, all share as a common subset of functions the ability to store messages intended for system users for later retrieval by those users. Each user is assigned a "mailbox" and may retrieve his messages by accessing the system and then identifying his "mailbox". In general, anyone having knowledge of the telephone numbers for the system, may leave messages, but only users having a "mailbox" may retrieve messages.

To retrieve messages a user of a typical voice mail system accesses the system over the telephone lines and, after identifying himself by mailbox number, and possibly a password, hears a recorded message produced by the system advising him of the status of his mailbox (e.g number of messages waiting, etc.). The user may then listen to brief prerecorded portions of each message, commonly referred to as "headers" which further describe the message, for example, by identifying the originator. The user may then decide whether or not to listen to each message.

Such systems have many disadvantages. First, it is necessary for a user to access the voice mail system and engage in an extensive system of prompts and responses merely to determine if there are messages in his mailbox; their number, or who originated the messages. Little, if any information is available to the user before he accesses the system. (Prior systems have been provided with a "message waiting" indicator, such as a lamp, or a change in the dial tone, or a limited text display, to indicate that the user has at least one message waiting; which is functionally identical to the commonly known system of message lamps provided on hotel telephones. Other systems may call a recipient at a predetermined time to deliver a particular message.) Second, prior voice message systems provide no way for the recipient of a message to determine its importance or urgency without accessing the system. An urgent message from the CEO and a casual invitation to lunch are identical to the addressee until he accesses the system. Thirdly, the user must access the system to determine the status of messages to which he has listened but not responded.

Small groups of interconnected stations, each having a capacity for the display of limited text messages are also known. Such a system is described in commonly assigned U.S. patent applications serial numbers 849,992; by D. Chamberlin et al. and 895,010; by N. D'Agosto et al. Such systems commonly include a microcomputer, such as an IBM PC, etc., to receive brief text messages input by an operator and to transmit these messages to each station. Also commonly, the stations are interconnected both over telephone lines, for example, through a PBX, and by conventional digital transmission lines, such as a twisted pair, for the transmission of the text messages in digital form.

Such systems commonly include an operator and one station associated with the microcomputer for use by an operator. The operator will receive calls for members of the group who are not at their desk and enter brief text messages for display on the corresponding user's station display, in essence, providing an electronic substitute for the well known pink message slip. While effective for their intended purpose, these systems require an operator and do not provide the automatic storage and forwarding of voice signals provided by voice mail systems.

Thus, prior art voice mail systems either required intervention by a user to provide the user with information about messages in his mailbox, or require the user to access the system to receive information; which is available only in audible form. Also, while voice mail systems which automatically call a recipient at a predetermined time provide a way for the originator to try to assure delivery of a message they do not provide a mechanism by which a recipient may check messages at his convenience Accordingly, it is an object of the subject invention to provide a voice mail system wherein a user may obtain information describing messages waiting without need to access the system.

It is another object of the subject invention to provide a voice mail system having a simplified form of user access.

It is still another object of the subject invention to provide a system which allows a telephone caller to originate text messages for display to an addressed system user automatically.

It is a more particular object of the subject invention to provide such a system where such descriptive information may include the identity of the originator of the message.

It is still another object of the subject invention to provide a voice mail system where a user may obtain information about messages in his voice mailbox by a visual scan of information.

BRIEF SUMMARY OF THE INVENTION

The disadvantages of the prior art are overcome, and the above objects are achieved, in accordance with the subject invention by means of an apparatus for storage and retrieval of voice signals which includes first input devices for input of the voice signals, second input devices for input of input control signals associated with the voice signals, the input control signals including addressee identification signals and message description signals, memory storage for storing the voice signals for later retrieval and output, telephone-like stations, each identified by a particular one of the addressee identification signals for output of the voice signals; each station including an audio output for the voice signals, a display for text messages, and circuitry for generating voice signal retrieval signals, and a controller for controlling the system operation. The controller responds to the input control signals to control the memory storage device to store the associated voice signals, outputs text messages corresponding to the stored voice signals to the stations identified by each particular one of the addressee identification signals for display; the corresponding text messages including information in accordance with the message description signals, and responds to the voice signal retrieval signals from the identified stations to control the memory storage device to output the stored voice signals to the identified stations for audio output.

In a preferred embodiment of the subject invention, the message description signals and the text messages include information which identifies the originators of the voice signals.

In another preferred embodiment of the subject invention, the stations further include signal inputs and the voice signal retrieval signal generating circuitry is responsive to the display and the signal inputs to generate voice signal retrieval signals corresponding to the displayed text messages so that voice signals associated with the displayed text messages are output to the associated stations.

In still another preferred embodiment of the subject invention, the message description signals and the text message include information describing the status of the corresponding voice signal (e.g. the voice signal is an urgent message, or is a reply to a previous message)

In still another preferred embodiment of the subject invention, the originator of a message may input control signals to automatically display a brief text message.

Thus, it may be seen that the subject invention clearly overcomes the disadvantages of the prior art and achieves the objects set forth above. Other objects and advantages of the subject invention will be apparent to those skilled in the art from consideration of the detailed description of preferred embodiment set forth below and the attached drawings.

BRIEF DESCRIPTION OF THE DRAWINGS

FIGS. 9 and 9A are a flow chart of the operation of the system of FIG. 1 when inputting a voice signal.

DETAILED DESCRIPTION OF THE PREFERRED EMBODIMENT

Figure 1:
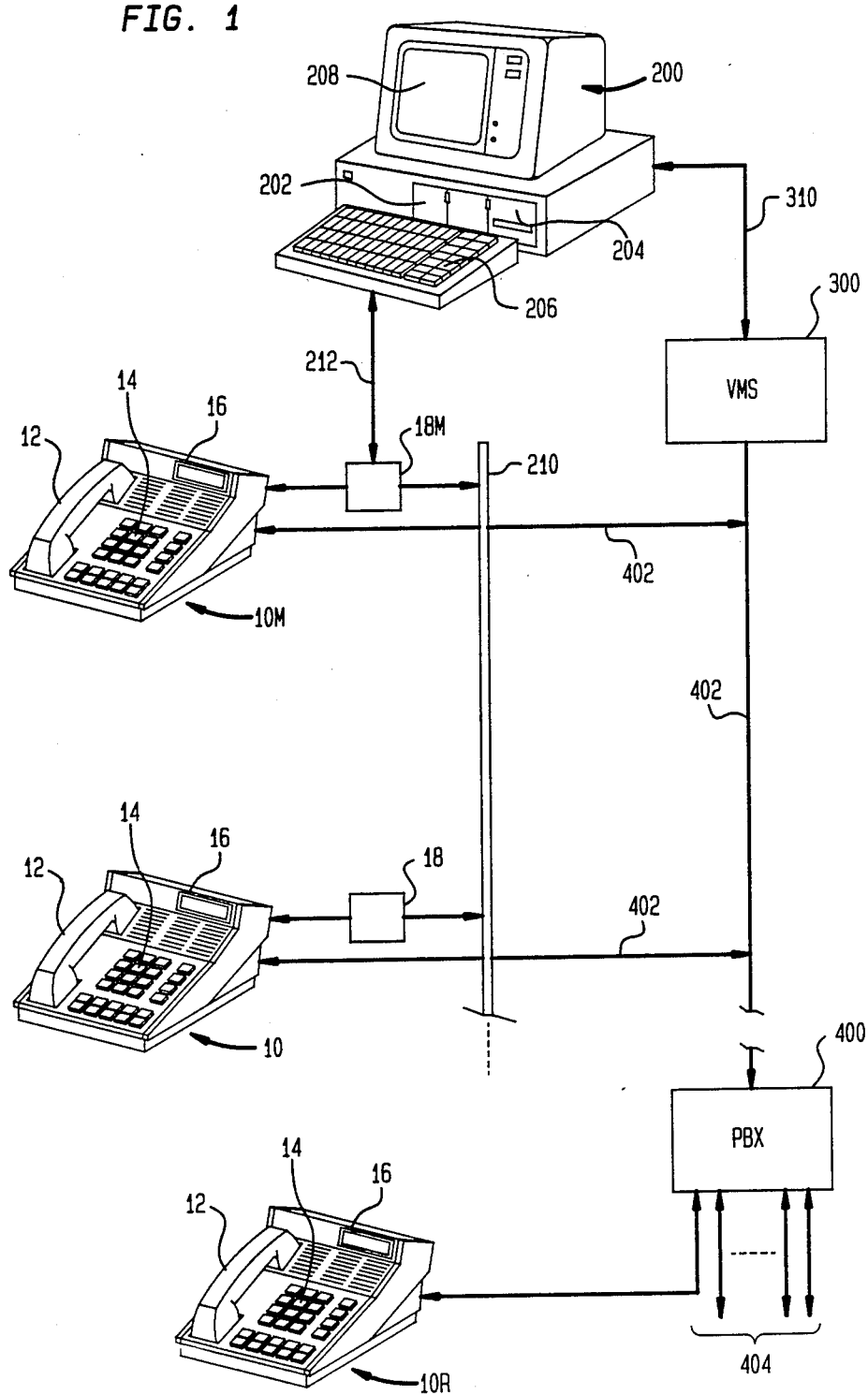
FIG. 1 is a schematic diagram of the system of the subject invention.

FIG. 1 shows a schematic diagram of a system in accordance with the subject invention. A plurality of telephone-like stations 10, including a master station 10m provide input and output for voice signals through handset 12, input various control signals through keyboard 14, and display text messages on display 16. The system may also comprise remote station 10r connected over the telephone system, as will be more fully described below.

Station 10m is connected through interface 18m to microcomputer 200. Computer 200 includes floppy disk drives 202, hard disk 204, keyboard 206 and CRT display 208, and is preferably a well known conventional microcomputer such as the IBM Model PC AT marketed by the IBM Corporation of Armonk, N.Y.

Computer 200 and station 10m are connected through interface 18m to digital data path 210 for the transmission of text messages and other digital information in a conventional manner well known to those skilled in the art. Data path 210 and interface 18m also provide a digital transmission path between stations 10 and computer 200. Thus, the system, as described so far, may operate as an electronic message center wherein an operator receives messages for users over station 10m and enters text messages for the users into computer 200 through keyboard 206 for transmittal to the appropriate station in the manner more fully described in the above referenced applications Ser. Nos. 849,992 and 895,010 and used in the communication system marketed by the assignee of the subject application under the trademark "Connexions". Computer 200 may also perform other tasks such as monitoring of telephone or dictation activity on the system, but such additional tasks are not relevant to an understanding of the subject invention and will not be discussed further here.

Computer 200 is further connected to voice message system (VMS) 300 over a data link 310. VMS 300 controls computer 200 over data link 310 to transmit text messages to stations 10m,10 in the above described conventional manner. VMS 300 establishes a correspondence between the text messages and stored voice signals in a manner which will be more fully described below. (While shown as functionally separate, it may be preferable for Computer 200 and VMS 300 to share common chassis, power supply, etc.)

PBX 400 is connected to stations 10m,10 and VMS 300 over internal telephone lines 402. Lines 402 allow transmission of voice signals to or from any of stations 10m,10; VMS 300; and PBX 400 in a conventional manner well understood by those skilled in the art. PBX 400 also allows connection of remote input devices such as station 10r and other conventional telephone stations to the system over external telephone network 404. PBX's are, of course, extremely well known devices for switching telephone signals whose operation is well understood by those skilled in the art and need not be discussed further here for an understanding of the subject invention. (Of course those skilled in the art will also recognize that central switching systems such as the well known "Centrex" system may be substituted for PBX 400.)

Figure 2:
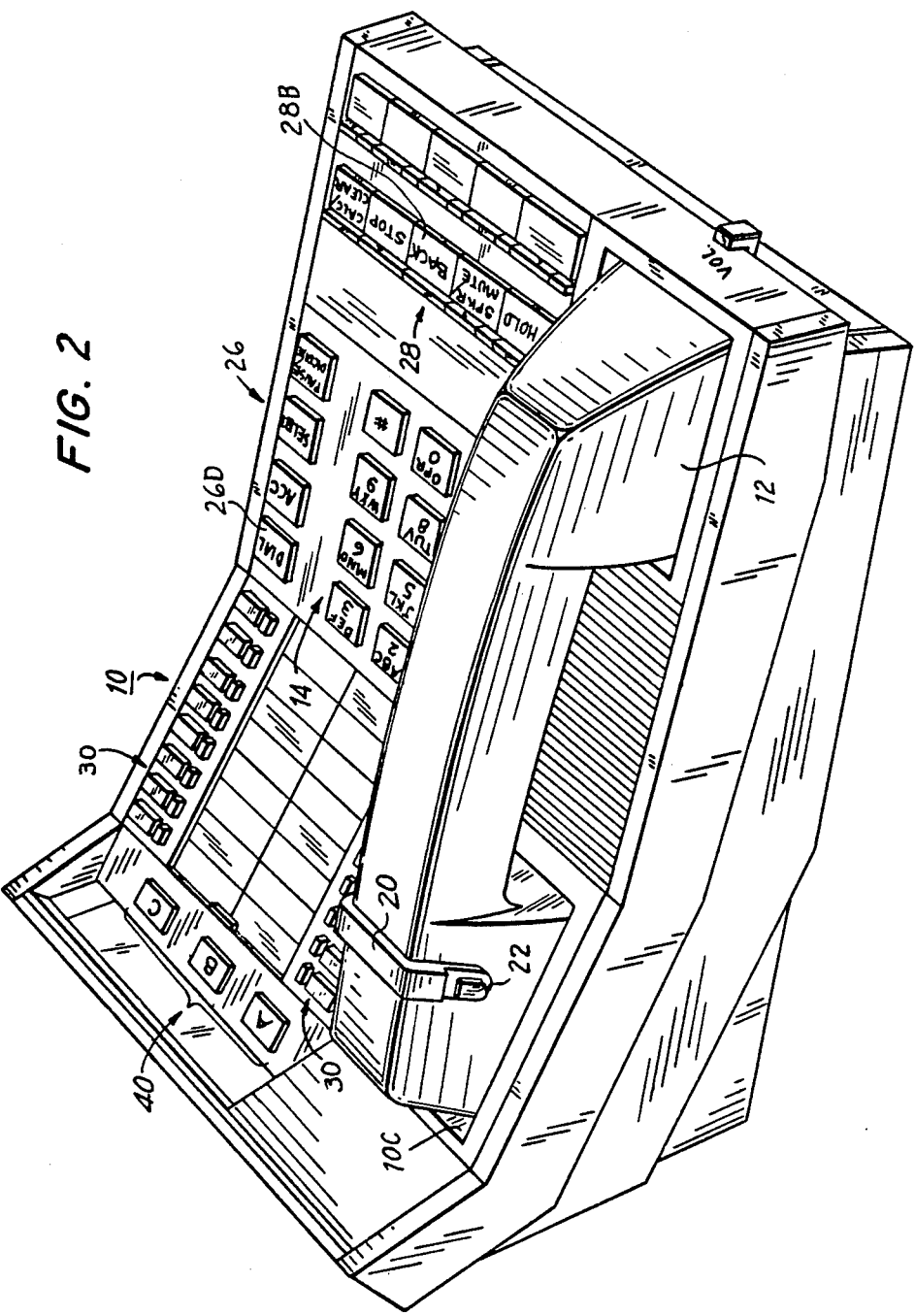
FIG. 2 is a perspective view of a station set used in conjunction with the subject invention.

FIG. 2 shows a perspective view of a station set 10 in accordance with the subject invention. Set 10 is structurally substantially identical to the "C" units described in commonly assigned co-pending U.S. patent application Ser. No. 895,017; to Chamberlin et al. the disclosure of which is hereby incorporated by reference.

Station set 10 contains electronic circuitry shown in FIG. 3 and which will be described in more detail below. Such circuitry includes a microprocessor, such as the Hitachi Model 6303; and differences between station set 10 and the above described "C" modules relate substantially only to the programming for this microprocessor as it relates to the display of messages on display 16 to indicate the status of stored voice signals in accordance with the subject invention.

Referring again to FIG. 2, station set 10 is provided with a handset 12 having a speaker and microphone, similar to handsets normally provided in conventional telephone instruments. Handset 12 is held in a cradle 10c integral to the top panel of station set 10, and which cradle includes a hook switch (not shown) whose function is substantially identical to the conventional hook switch normally provided in telephones. Handset 12 differs from conventional telephone handsets in that it has a control yolk 20 and a control button 22. Yoke 20 and button 22 are useful when station set 10 is to be used with a dictation unit, as is more fully described in the above reference commonly assigned patent application, and yoke 20 may also be used in recording responses to stored voice signals A handset such as handset 12 is shown in U.S. Pat. No. 3,872,263, assigned to the assignee of the present invention. On the top panel of station set 10 various keys are located, including conventional push button telephone keypad 14, preset function keys 26 and 28, user-programmable keys 30, and "soft" keys 40. A user of station set 0 may initiate a telephone call by depressing appropriate keys to "dial" a conventional telephone number, by thus providing either Dual Tone Multiple Frequency (DTMF) signals (marketed by various telephone companies under the trademark "Touch Tone") or conventional dialing pulses. User-programmable keys 30 maybe programmed to dial a preselected telephone number in a manner which is described in the above reference commonly assigned U.S. patent applications. Similarly, the function keys 26,28 are generally used in a known manner described more fully in the above reference commonly assigned U.S. patent application and need not be discussed further here for an understanding of the subject invention. However, the "Dial" key 26d and the "Back" key 28b preferably maybe used in the subject invention in a manner which will be more fully described below.

"Soft" keys 40 are keys whose function is controlled by programming in a well known conventional manner. Preferably "Soft" keys 40 will be used in the subject invention to control the display of text messages relating to stored voice signals in a manner which will be described more fully below. Such use allows simple adaptation of existing "C" units to the subject invention with only programming changes, though those skilled in the art will readily recognize that additional fixed function keys could readily be provided Those skilled in the art will, of course, recognize that station set 10 preferably will also include conventional telephone and dictation functions such as are commonly known and/or are described in the above referenced commonly assigned U.S. patent application Ser. No. 895,017, however descriptives of such functions are, in general, not believed necessary to an understanding of the subject invention and will not be discussed further here except to such limited extent as they may interact with capabilities of the subject invention.

Figure 3:
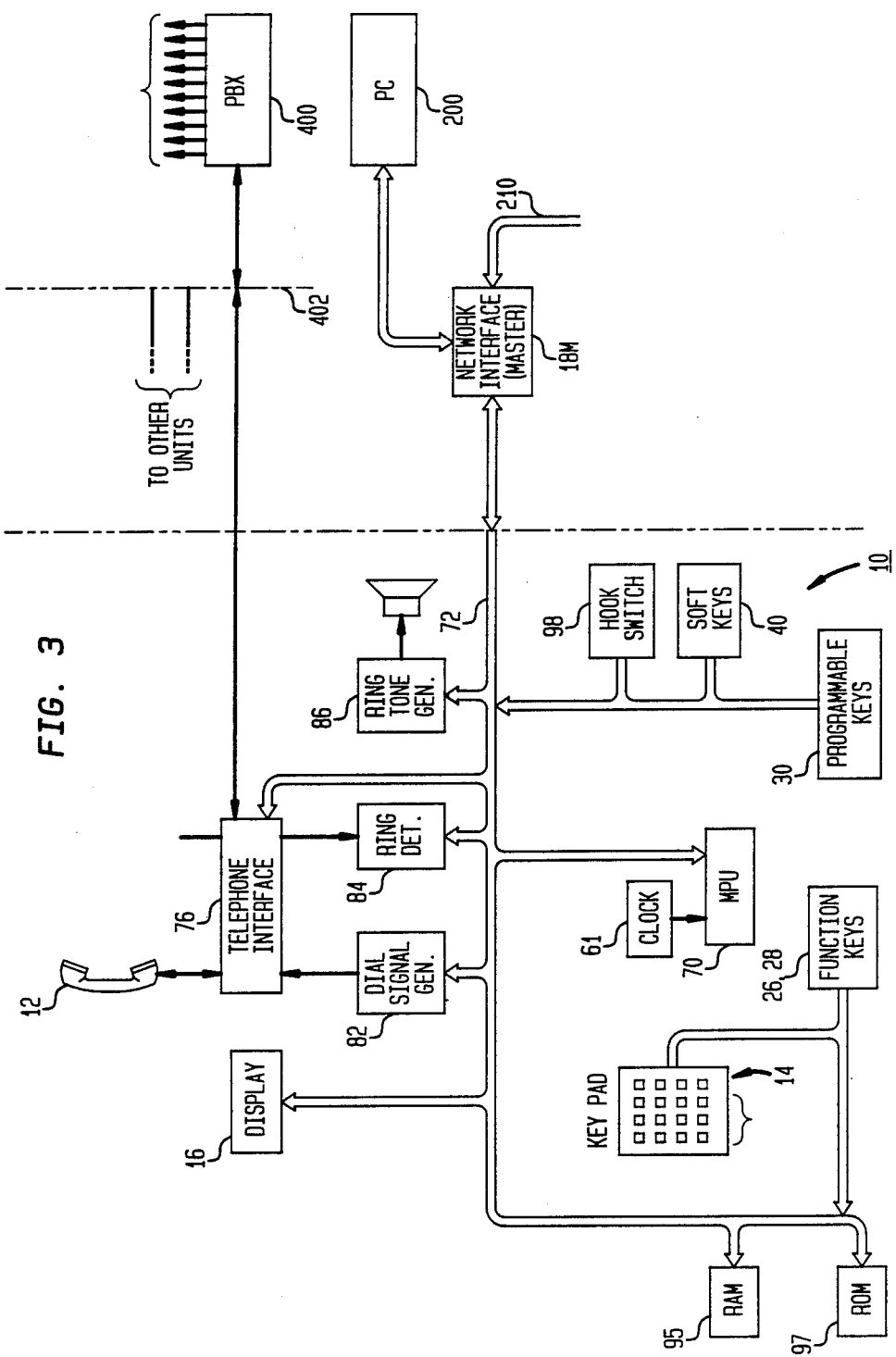
FIG. 3 is a schematic diagram of the station set of FIG. 2.

FIG. 3 shows a schematic block diagram of some of the relevant circuitry of station set 10 and its interconnection to the system of the subject invention. Consideration of the above referenced commonly assigned U.S. patent application will show that the circuitry of FIG. 3 is substantially identical to that of the "C" units, however, certain elements, such as those relating to dictation functions, are not believed relevant to an understanding of the subject invention and are not described here.

As in shown in FIG. 3 station set 10 includes a microprocessor 70 and a telephone interface 76. Also shown are keypad 14, function keys 26 and 28, programmable keys 30, and soft keys 40, as well as hook switch 98, which is normally opened when handset 12 is placed in cradle 10c and is closed when handset 12 is removed from cradle 10c.

As is shown, microprocessor 70, which may be a conventional microprocessor such as the Hitachi Model 6303, is coupled to keypad 14, function keys 26 and 28, soft keys 40, and hook switch 98. Actuation of any of the keys or switches connected to microprocessor 70 is detected in a conventional manner well known to those skilled in the art. Details of conventional interface circuitry, such as switch detectors is omitted from FIG. 3.

Random access memory (RAM) 95 and read-only memory (ROM) 97 are provided; the RAM memory for data and variable program storage and the ROM memory for fixed program storage.

A clock signal source 61 is provided to generate timing signals for set 10 and for a time and date function. Source 61 has a battery back-up so that it will not lose power during temporary power failures.

Bus 72 couples microprocessor 70 to display 16, various keys 14, 26, 28, 30, and 40, interface 18, telephone interface 76, dial signal generator 82, ring detector 84, ring tone generator 86, RAM 95, ROM 97, and hook switch 98. Microprocessor 70 operates to control various elements connected through bus 72 to perform conventional telephony functions in a well known manner more fully described in the above referenced commonly assigned U.S. patent application.

Referring still to FIG. 3 and to FIG. 1, it can be seen that microcomputer 200 is connected to a plurality of station sets 10, 10m through interface 18m and data bus 210. Interface 18m acts as a network controller to control polling of stations 10, 10m for conventional communication of text messages in digital form. As is described in the above referenced commonly owned U.S. patent application Ser. No. 895,017, station set 10m may be used in conjunction with microcomputer 200 as an operator controlled electronic message center in the manner described above where an operator enters text messages through keyboard 206 for transmission to one or more of station sets 10, 10m. Upon receipt of this message by interface 18, signals are transmitted to microprocessor 70 which controls display 16 to provide a visible indication of the receipt of the text message. The text message is stored in RAM memory 95 and may be accessed and displayed on display 16 in response to predetermined control signals entered by a user. Note that memory 95 permits a number of text messages to be stored for later retrieval by the user. These capabilities are described in further detail in the above referenced commonly assigned U.S. patent application and are also used in accordance with the subject invention in a manner which will be more fully described below.

Handset 12 and other station sets 10 are connected through telephone lines 402 and telephone interface 76 to provide a voice signal communication path for users of the system of the subject invention. PBX 400 is also connected to telephone lines 402 to provide connection to off-net telephone systems and voice message system 300 is connected to telephone lines 402 to provide a voice signal storage and retrieval function.

Figure 4:
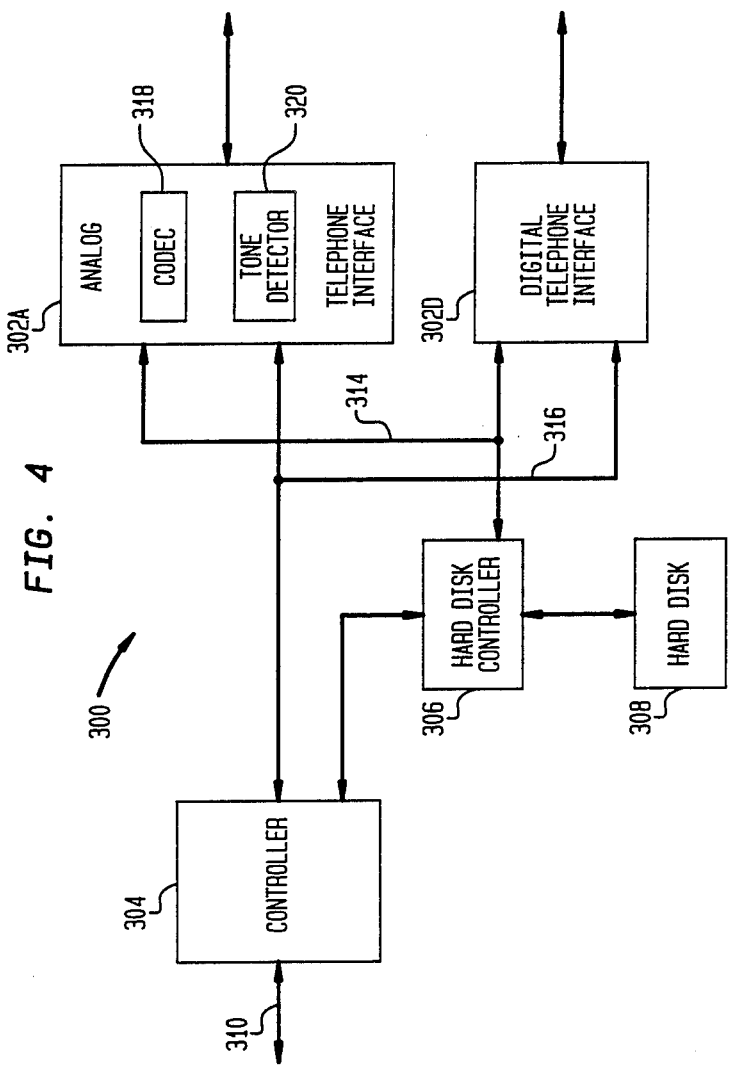
FIG. 4 is a schematic block diagram of a voice mail system used with the subject invention.

FIG. 4 shows a schematic block diagram of voice mail system 300. As noted above, voice message system are known and the system of FIG. 4 will be described in simplified terms without reference to details of design which are not necessary for an understanding of the subject invention. Voice Mail systems may be considered as comprising three essential elements; telephone interfaces 302, controller 304, and a mass storage device shown in FIG. 4 as a hard disk controller 306 and hard disk 308. Telephone interfaces 302 receive voice signals over telephone lines and convert them to appropriate digital format for storage and later retrieval on disk 308. Interfaces 302 also perform conventional telephony operations such as ring detection, dial signal generation, etc. Interfaces 302 may be either analog, interface 302a, or digital, interface 302d. Analog interface 302a receives voice signals in analog form as well as control signals in DTMF form and includes a "codec", (a form of analog-to-digital converter used in telephony) 318 and a tone detector 320 to convert the received signals to appropriate digital form. Digital interface 302d is designed to receive voice signals as well as control signals in a digital form specified by one of the various vendors of digital telephone equipment. In either case, control signals from interfaces 302 are transmitted to controller 304 over control bus 316 while voice signals, converted to an appropriate digital format, are transmitted through disk drive controller 306 to disk 308 over data bus 314. Controller 304 responds to various control signals to control interfaces 302 and controller 306 to identify various voice signals with selected addressees and store them on disk 308 for later retrieval. Such operation of voice message systems is known and is described in the above reference commonly assigned U. S. Patent Application Nos. 013,303 and 013,304 as well as the above referenced U.S. Pat. No. 4,371,752.

Voice mail system 300 also includes a data link 310 to microcomputer 200. Data link 310 may be conventional or may be specially designed for voice mail operation, however, its details are not believed to comprise part of the subject invention per se. Controller 304 signals microcomputer 200 to transmit various messages relating to stored voice signals in a manner which will be more fully described below Those skilled in the art will recognize that in principle there is nothing to prevent communication of text messages directly from controller 304 to station sets 10; however, because control of voice signal and retrieval functions is computationally intensive, it is believed preferable to make use of the known text message capability of microprocessor 200, which of course, may also be used for other functions such as monitoring the operation of station sets 10. It should be recognized that in principle it will be possible to implement the subject invention with voice mail systems of any capacity, however, in the preferred embodiment described herein, the subject invention is implemented for use by a small work group, on the order of about 20 to 30 persons. In such an application a voice mail system of limited capacity, having for example, 2 ports (i.e. telephone interfaces) and providing from 30 minutes to 1 hour of digital voice storage may be implemented on a single printed circuit board mounted in an expansion slot provided in microcomputer 200 and utilizing hard disk 204 as a mass storage device. (Note expansion slots are commonly provided in commercially available microcomputers.)

Figure 5:
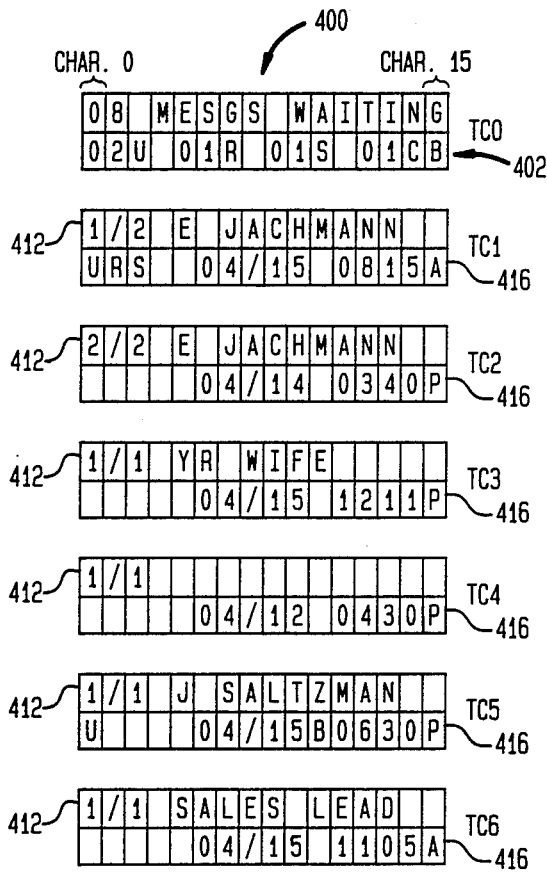
FIG. 5 is an illustration of a typical sequence of displayed text messages.

FIG. 5 shows a typical sequence of messages which may be displayed on station set 10, 10m, 10r. Text message TC0 is generated by microprocessor 70 locally and represents a summary of the other messages stored in the station set. Typically, display 16 will comprise a two line display having 16 characters per line. In message TC0 the top line 400 is used to show that there are eight messages waiting. Characters 0-2 of the second line 402 show that two of these messages are urgent, characters 4-6 show that one message is a return message, characters 8-10 show that one message is a saved message, and characters 12-15 show that one message is a type hereinafter referred to as a Callback message, which will be described further below.

Message TC1 is the first text message displayed. Characters 0-2 of the first line 412 show that the message displayed is the $m^{th}$ of n messages from that originator; for TC1 and all other messages. Characters 4-15 in the first line 412 are used to display text identifying the originator of the message. In text message TC1 a system user has identified himself by an originator ID and the system has internally generated text (e.g. the originators name) to identify the originator. In message TC3 characters 4-15 have been used to display an arbitrary text entered using DTMF tones in a manner which will be described further below, while in text message TC4, the originator has not chosen to identify himself.

Text message TC2 is the second message from the originator of the first (i.e. E. Jachmann) and is accessed as described below.

Characters 0-2 of the second line 416 are used to identify the status of the message. Thus, text message TC1 identifies an urgent message, which is returned in response to a previous communication, and which is a saved message.

By a "saved" message herein is meant a message which has been accessed by its addressee which the addressee has chosen to save for later reference.

Characters 5-9, 418 and 11-15 420 in the second line identify the time and date the text message was received. Note that since station set 10 includes an internal clock, a time and date may be generated locally.

Message TC5 is a Callback message which differs from the other messages shown in FIG. 5 in that it is not necessarily associated with a stored voice signal. In message TC4 characters 4-15 indicate to the user that he should return a call to the party identified by the displayed text in characters 4-15. If the user depresses Dial button 26 the party's number will be autodialed in a conventional manner. Again, characters 416 are used to indicate whether the message is urgent or a return. Callback messages, of course, are not saved after the call has been successfully returned. Characters 418 again display the date the Callback text message is received, but characters 420 may be used in a different manner. If the originator chooses, characters 420 maybe used to display the latest time he may be called. If the user chooses to do this, character 424 will be used to flag the fact that the time shown is not the time the message was received. Otherwise, the time the message was received will be shown in characters 420 and character 424 will not be active.

If the originator of a Callback message is not a system user and so cannot be identified by the system, he may record a brief voice signal identifying himself, which will be played before the call is returned, as will be described below.

Figure 5A:
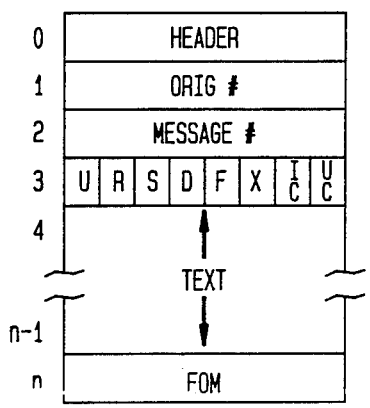
FIG. 5A is an illustration of the format of a transmitted text message.

Message TC6 shows a message which is identified as to subject. A number of persons may be given a common identification number to use with messages relating to a particular subject; in the example shown, sales leads. To the system "sales leads" will appear to be one user and those messages will be grouped as described below. FIG. 5a shows the format of a message transmitted by microcomputer 200. Word 0 in this message is a header which identifies the message as relating to a stored voice signal and distinguishes it from other messages which may be transmitted from microcomputer 200 for display. Word 1 identifies the originator of the message, or the type of message (e.g. unidentified). Word 2 identifies the number of the message for each originator or type of message. Word 3 contains a number of flag bits. Bits 0–2,U,R,S, define the urgent, return, and save status. Bit 3,D, is set if the message is an update of a previously stored message. Bit 4,F, is set by voice mail system 300 when a stored voice signal has not been accessed within a predetermined period of time and may be purged. When station 10 detects bit 4 it causes the message number to flash to alert the user of this fact. Bit 5,X, is set by voice mail system 300 to advise the station set that the corresponding voice signal has been purged so that the text message may be deleted. Bits 6 and, IC, UC, 7 identifies that the message as either an identified or unidentified Callback message, respectively. Words 4 - n-1 contain the text to be displayed, or the number to be called for a Callback message. Word n is a End Of Message word indicating that it is the last word. Note that since station set 10 includes a microprocessor 70; formatting and the inclusion of standard text and the time and date may be handled locally at the station set.

Figure 6:
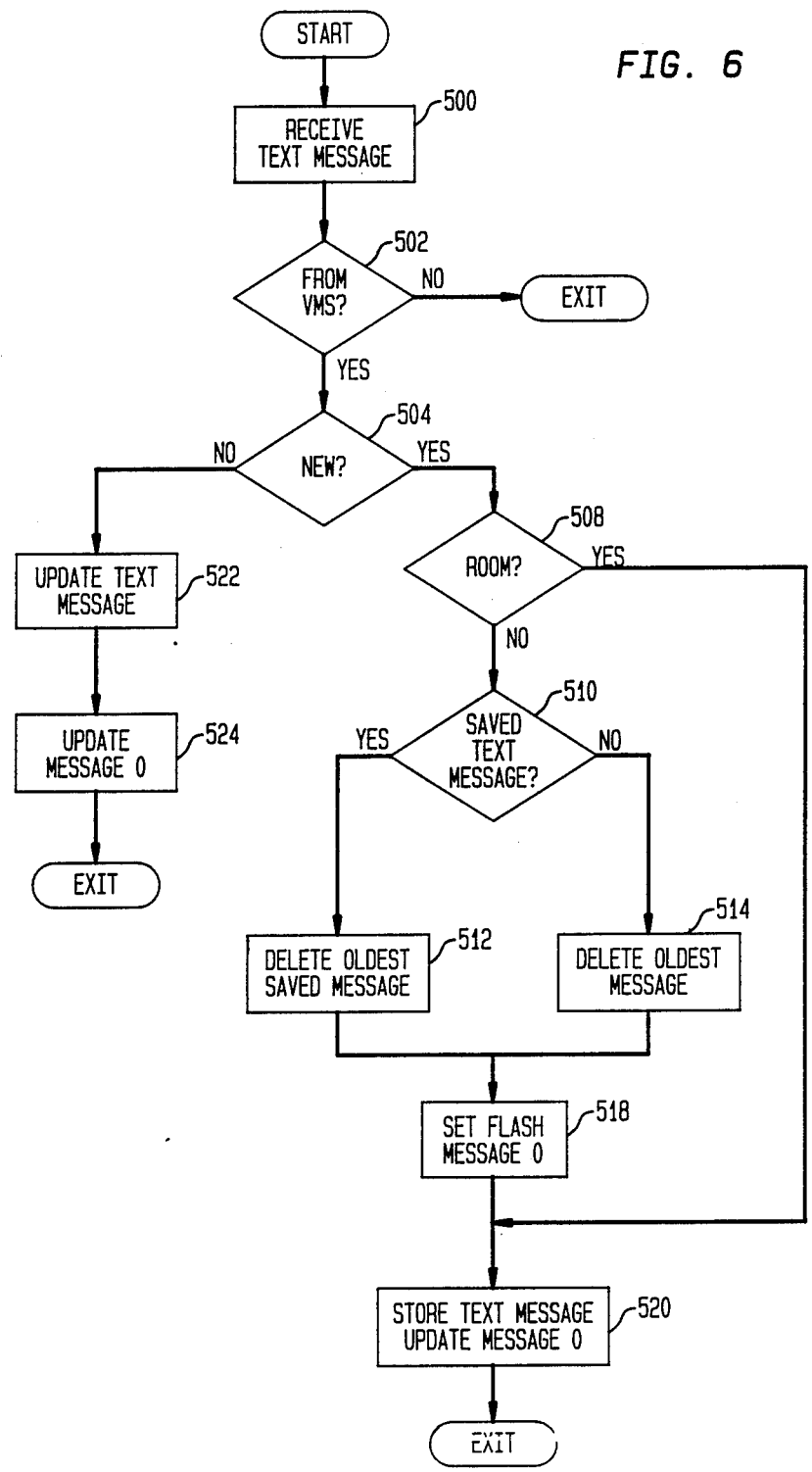
FIG. 6 is a flow chart of the operation of the station set of FIGS. 2 and 3 when receiving a text message.

Turning to FIG. 6 a flow chart diagram of the operation of station set 10 is shown. At 500 in FIG. 6 a message from microcomputer 200 is received in a conventional manner. At 502 microprocessor 70 tests header byte 0 to determine if the message is from voice mail system 300. If it is not microprocessor 70 exits to other appropriate routines which need not be considered here for an understanding of the subject invention. If the text message is from System 300, at 504 microprocessor 70 tests the update flag, D, bit 4, byte 2 to determine if the message is a new message or is an update of a previously received message. If the message is a new message at 508 microprocessor 70 tests RAM memory 95 to determined if there is sufficient room to store the new message. If there is not sufficient room in RAM memory 95, at 510 microprocessor 70 tests to determine if a text message relating to a saved voice signal is stored. If so, at 512 the oldest such text message is deleted. If there is no such message at 514 the oldest text message is deleted. Then at 518 microprocessor 70 sets an internal flag to cause at least a portion of Message 0 to flash when displayed. (As will be described further below, Message 0 is a summary text message which displays totals of the text messages stored in RAM memory 95 when the voice mail capability of station sets 10, 10m are accessed in accordance with the subject invention.) By so flashing at least a portion of Message 0 a user will be alerted that further voice signals are stored on System 300 beyond those indicated by the displayed text messages At 520 microprocessor 70 then stores the received text message and updates Message 0 to reflect the new summaries of text messages stored and exits.

Returning to 504, if the text message is not new as determined by examining status bit D in the message at 522 the previously stored corresponding text message is updated, and at 524 text message 0 is updated to reflect any new summary and processor 70 exits.

Figure 7:
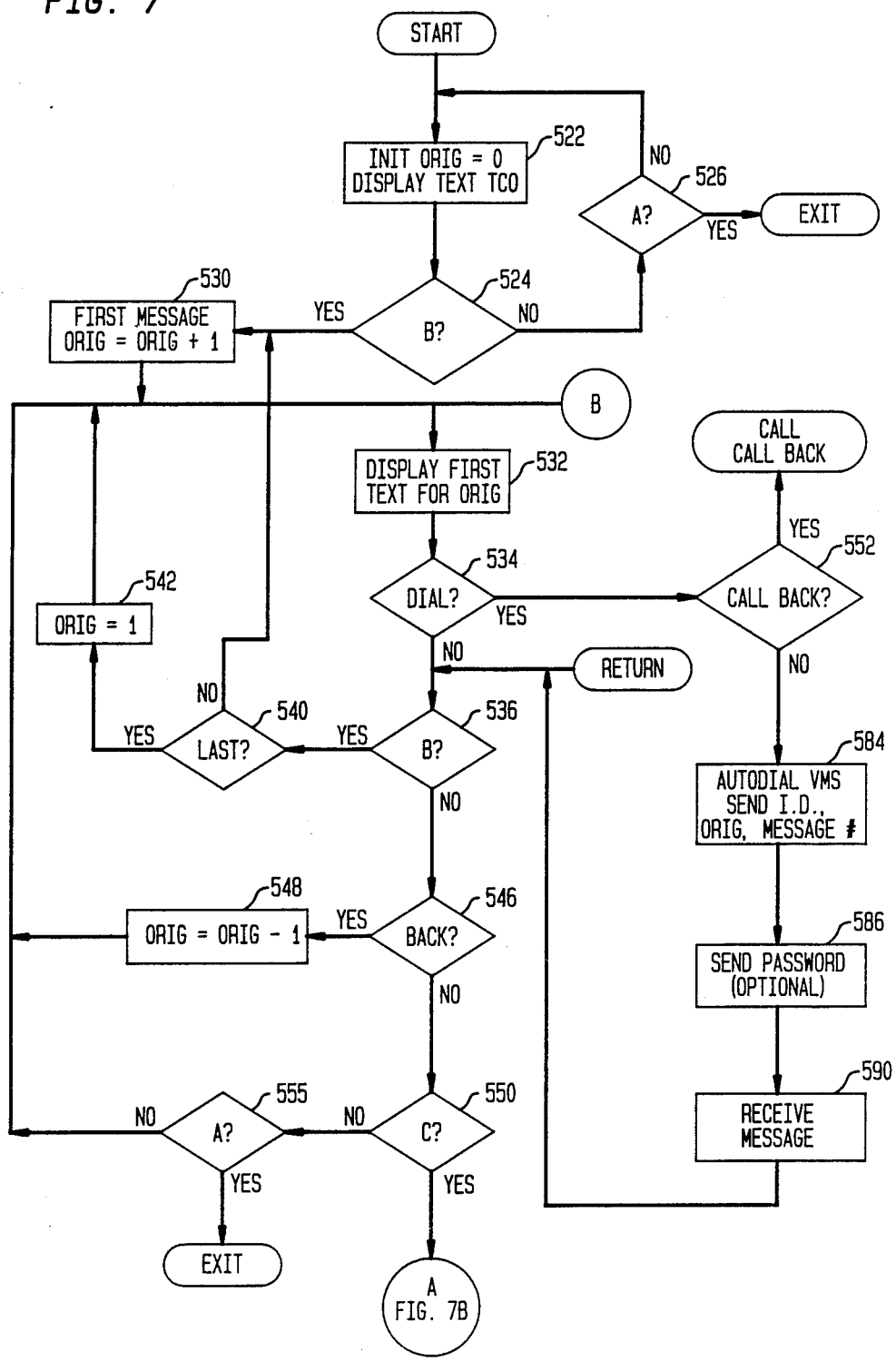
FIGS. 7, 7A and 7B are a flow chart of the display of a text message.
Figure 7A:
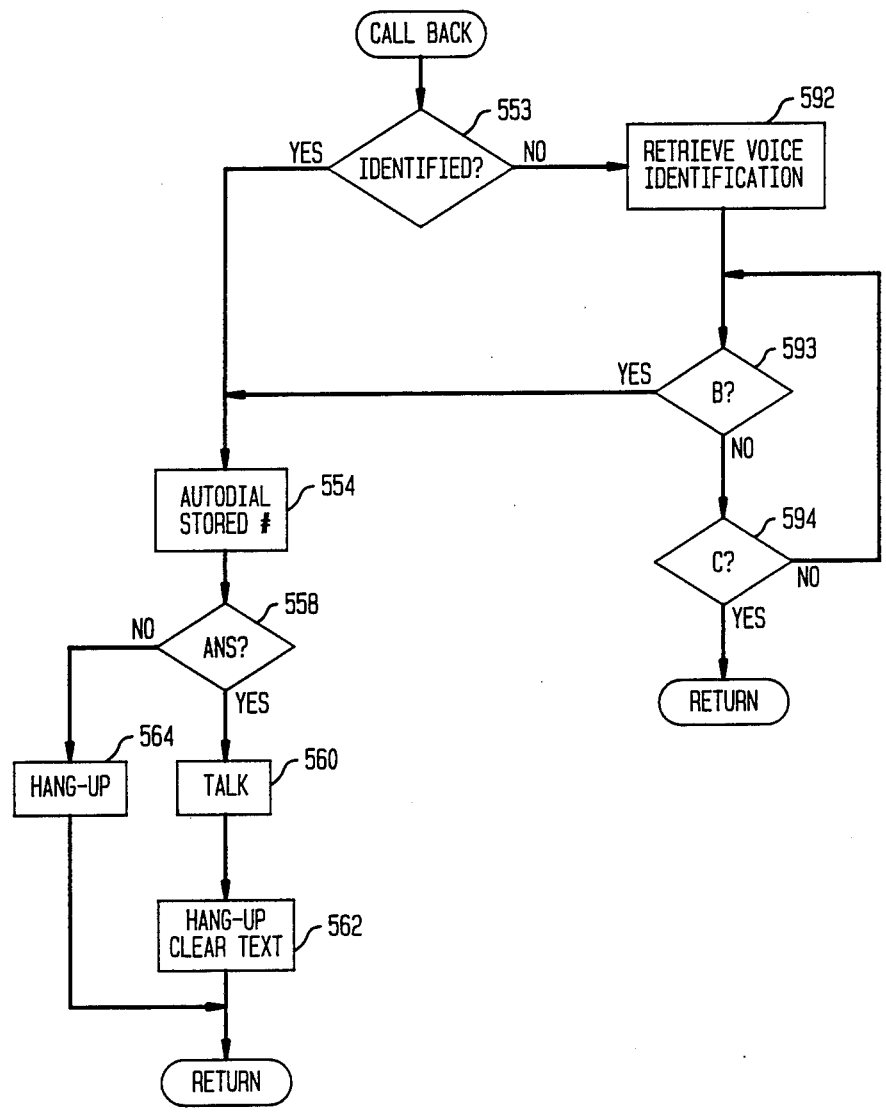
Figure 7B:
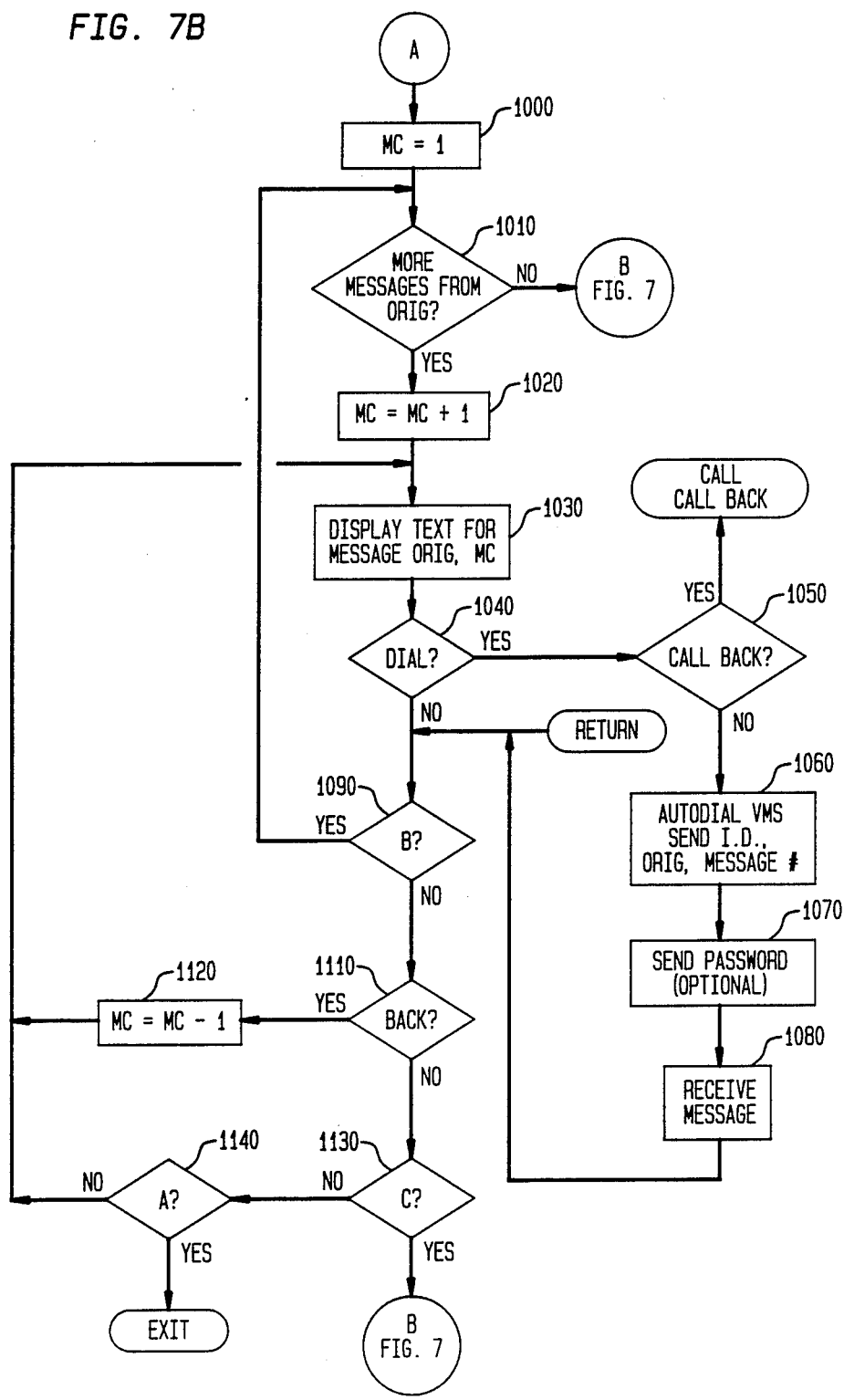

FIGS. 7, 7A and 7B show a flow chart of the operation of station sets 10, 10m, 10r in displaying stored text messages and the use of the displayed messages by a user of a system to access voice signals stored in voice mail system 300.

Initially, processor 70 enters the routine at 522 and responds to a command entered by a user. Preferably, softkey 40A maybe used to initiate display of stored text messages. At 522 text message 0 is displayed. As has been described above, text message 0 is generated locally by processor 70 and displays a summary of the text messages stored. At 524 processor 70 tests for a signal from another selected control, preferably softkey 40B. Until a B signal is generated at 524, system will continue to loop through 522 unless at 526 softkey A is depressed again; in which case the system exits.

When the user presses softkey 40B at 530 the system at 532 displays the text message relating to the first voice signal from the first originator (or message type). At 534 the system tests to see if the "Dial" button 26D has been pressed by the user. If a Dial signal is detected, station set 10 will initiate an autodial function in accordance with the displayed text message in a manner which will be described further below. If Dial is not detected at 536 the system tests for the B signal. If B is detected at 540 the system tests to determine if the displayed text message relates to the last originator. If it does not, the system returns to 530 to increment counter ORIG and display the next text message at 532. If it is, at 542 ORIG is set equal to 1 and the system returns to 532 to display the first text message again. If B is not detected at 546 the system tests for a signal from "Back" button 28B. If Back is detected at 548 counter ORIG is reduced by 1 and the system returns to 532 to display the previous text message. At 550 the system test for another programmable key, preferably C, and if detected displays further messages from that originator as described with respect to FIG. 7B below. At 555 the system tests for A again and, if detected, exits. If C, B, Back, or A are not detected, the system returns to 532 to continue display of the present text message.

Returning to 534, if a Dial signal is detected at 552, the system tests to determine if the displayed message is a Callback message. As described above, Callback messages are text messages in a predefined format which are not necessarily associated with any stored voice signal, but which simply request the user to return a call to the displayed name. The Callback routine is shown in FIG. 7A. If the displayed text message is determined to be an identified Callback message at 553, at 554 in FIG. 7A the system autodials the callback number which is preferably displayed on display 16. Those skilled in the art will recognize that this autodial function is essentially identical to the autodial capability described in the above reference commonly assigned U.S. patent application and known in other "smart" telephones. Essentially processor 70 controls Dial Signal Generator 82 to cause a stored telephone number to be automatically dialed. A further description of this function is not believed necessary for an understanding of the subject invention and will not be given here.

If at 553 the system determines that the Callback message is unidentified the system contacts VMX 300 and a brief voice signal identifying the caller is played at 592. Then at 593, if B is detected the system goes to 554 to autodial to complete the Callback, or, if C is detected at 594 the system returns to FIG. 7 (or FIG. 7B if called from there).

At 558, the system determines if the autodialed number has completed; either after a predetermined number of rings or in response to a hang-up signal from the user. If there is an answer at 560 the user may talk to the originator of the Callback message (or whoever else may answer) and at 562 the system clears the text of the Callback message and hangs up and returns. Otherwise, at 564 the system simply hangs up and returns.

Returning to FIG. 7, if at 552 the displayed text message is not a Callback message, then at 584 station set 10 autodials voice mail system 300 and transmits its station identification and the message number corresponding to the displayed text message. Optionally, then the system may wait to allow the user to enter a password at 586. At 590 the user will then receive the stored voice signal corresponding to the message number associated with the displayed text message.

At 590 the user may, of course, have all the functionality of known voice mail systems during playback For example, the user may have the capability to immediately store a reply or to forward the stored voice signal to a second user of the system.

After receipt of the stored voice signal, the system goes to 532 and continues as described above.

If at 550 in FIG. 7, the user presses programmable button C the system will display further messages from the same originator, as shown in FIG. 7B. At 1000 a Message Counter (MC) for that originator is initially set to 1. At 1010 the system tests to determine if there are, in fact, additionally messages to be displayed. If there are not, the system returns to B in FIG. 7 and continues to display the original text message at 532. If there are further messages, counter MC is incremented at 1020 and the corresponding text message is displayed at 1030. At 1040 the system tests to determine if the user has pressed the DIAL button. If so, at 1050 the system tests to determine if the message is a Callback. If the message is a Callback, the Callback Routine shown in FIG. 7A is called and proceeds as described above. After completion of the Callback Routine, the return is to 1090. If the message is not a Callback, the stored voice signal is played back at 1060, 1070, and 1080 exactly as described for message playback in FIG. 7.

In all cases, the system then, at 1090, test for B. If B is detected at 1100 the system test to determine if this is the last message for that originator. If it is not, the system returns to 1020 and continues. If it is the last message, the system returns to B in FIG. 7 to continue display of text messages for each originator. At 1110 the system tests for BACK. If BACK is detected at 1120, the counter MC is decremented and the system returns to 1030 to display the previous test message. At 1130 the system tests for C. If C is detected, the system returns to B in FIG. 7 to continue display of text messages for each originator. At 1130 the system tests for A, and if detected, exits. If none of these signals are detected, the system returns to 1030 and continues to display the current text message.

Preferably, in a system accordingly to the subject invention, messages from each originator, or of each message type, may be ordered for access in reverse, chronological order, with the most recent message being displayed initially for each originator or message type. The order of access, however, for these initial messages as described with respect to FIG. 7, may be either chronological, reverse chronological, or any predetermined order established for each originator of message type.

Figure 8:
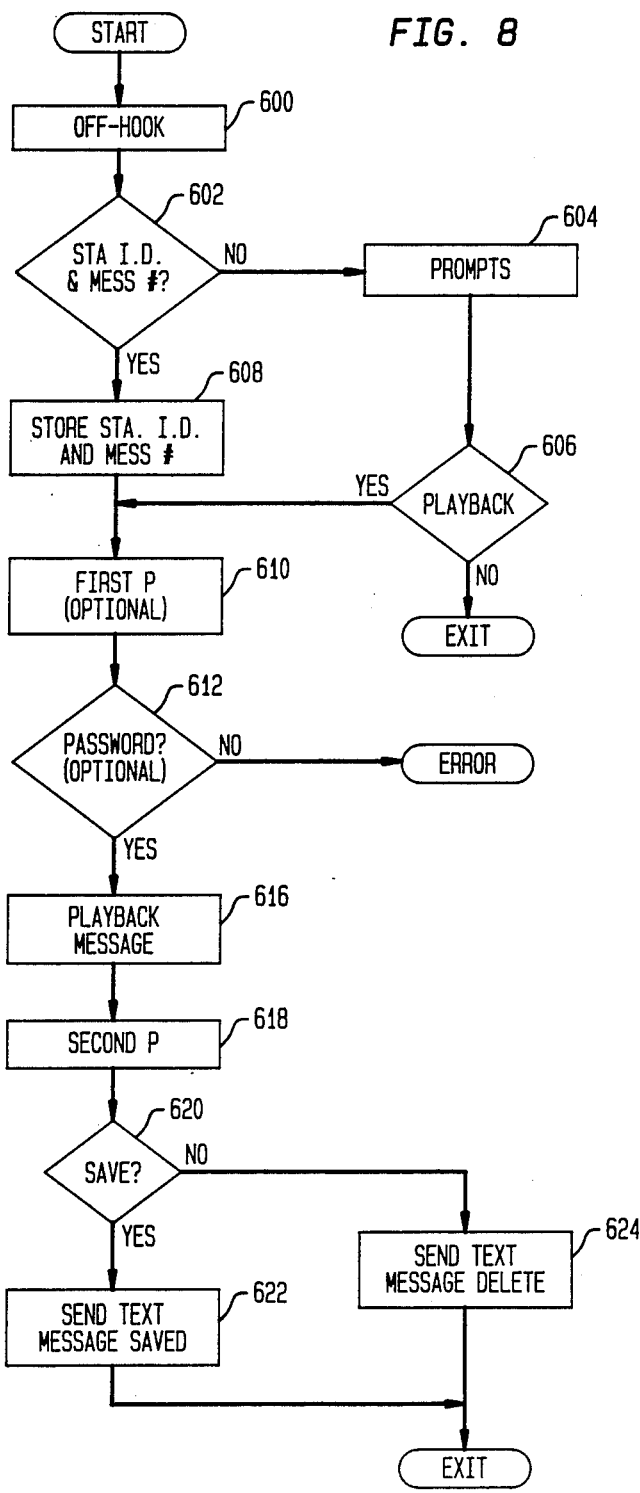
FIG. 8 is a flow chart of the operation of the system of FIG. 1 when outputting voice messages.

Turning to FIG. 8, a flow chart of the response of voice mail system 300 to autodialing from one of station sets 10, 10m, 10r is shown. At 600 the system goes off hook in response to a ring signal from the calling station set. At 602 the system tests for receipt of a station ID and message number. If these are not detected at 604, the system will realize that the incoming call has not been initiated by the autodial function of a station set and will issue a series of prompts in a conventional manner. In response to these conventional prompts a user may record or access previously stored voice signals in a conventional manner typical of known voice mail systems; thus, allowing voice mail system 300 to be used as a conventional voice mail system. If the user's responses indicate that he wishes to playback previously stored voice signals, the system returns to the playback routine as will be described further below.

If the system detects the station ID and a message number, they are stored at 608 and, at 610, the system may optionally playback a first prompt requesting a password. If, at 612, the optional password is determined to be incorrect, the system enters a predefined error routine. If the optional password is correct at 616 and the system plays back the previously stored voice signal identified by the station ID and message number At 618 the system plays the second prompt requesting that the user determine whether or not the message just accessed should be saved. If, at 620, the user's response indicates that the message should not be saved, at 624, the systems sends a text message, as described above, to the calling station set 10, 10m, 10r indicating that the stored voice signal has been deleted. Otherwise, at 622 the system sends a text message indicating that the stored voice signal has been saved. In either event, the system then exits.

As described above, in the preferred embodiment of the subject invention described herein, microcomputer 200 is programmed to transmit text messages, preferably, in digital form to station 10, 10m and voice mail system 300 is programmed to appear essentially as a second keyboard to microcomputer 200. That is system 300 receives DTMF inputs from a user and responds to generate text messages in a predetermined format for transmission by microcomputer 200. This allows simple integration of existing display telephone systems, such as that described in the above reference commonly assigned U.S. Patent Applications, into the system of the subject invention. However, those skilled in the art will recognize that such formatting and translation tasks could easily be carried out by microcomputer 200 with voice mail system 300 simply transmitting the necessary parameters in a convenient digital form. Programming of such a system will be well within the capability of those skilled in the art and the decision would be based on estimates of the computational loading on each of the processors.

Figure 9A:
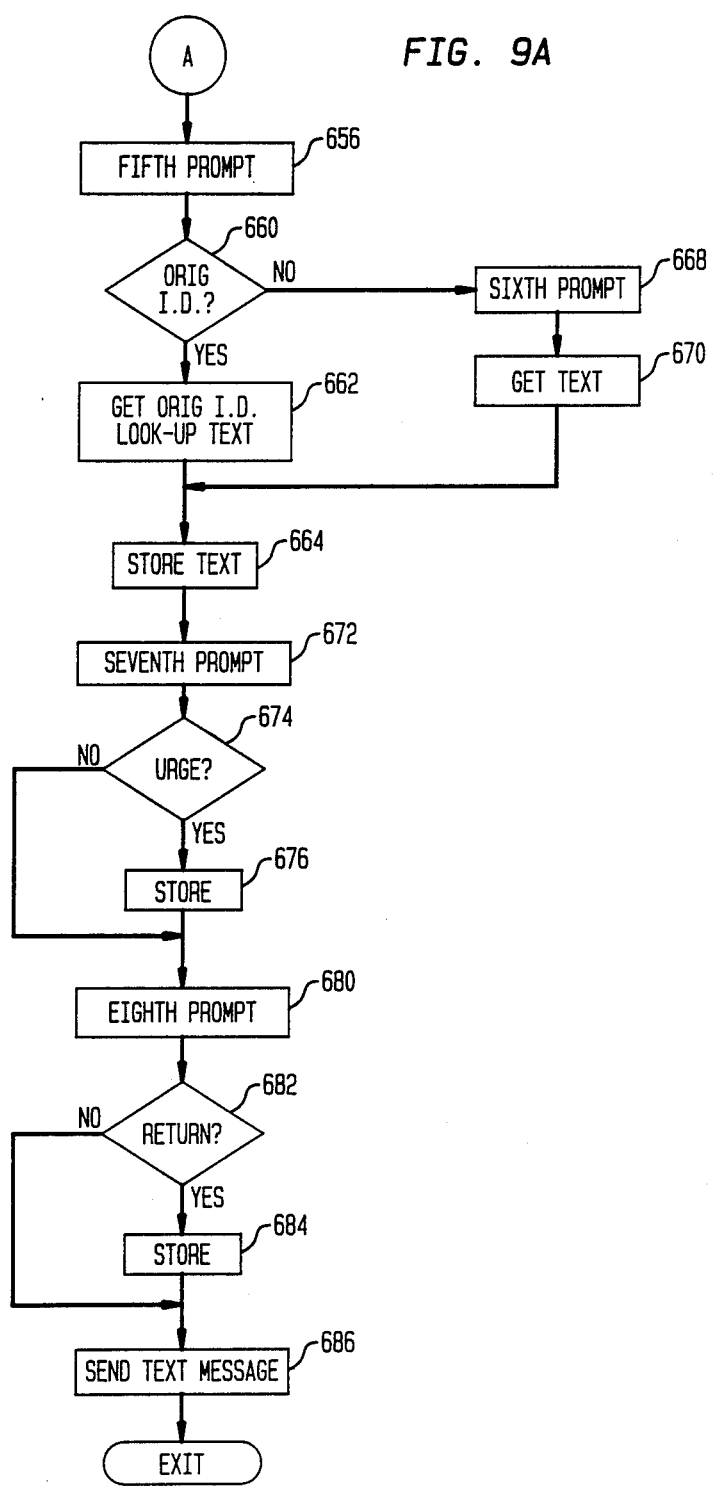

In FIG. 9 a flow chart of the operation of Voice Mail System 300 in storing a voice signal is shown. At the start it is assumed that the user has responded to previous prompts, such as described with respect to FIG. 8, to establish that he or she wishes to input a signal for storage and later retrieval. At 632 the user is prompted to identify an addressee. At 634 the address is stored.

For purposes of this description, it will be assumed that all addressees have station sets 10, 10m, 10r. However, those skilled in the art will recognize that it would be a routine matter to distinguish between users who are on the network (i.e. have station sets) and "dial-up" users who would retrieve their messages from voice mail system 300 in a purely conventional manner by dialing up the system from any telephone, or at least any telephone having DTMF capability.

At 642 the user is prompted to determine if a voice signal is to be stored. If at 644 the system detects that a voice signal is to be stored then at 646 the system then prompts the user to input a voice signal and at 648 this signal is recorded and stored (commonly referred to as "Talkdown"). At 650 the system transmits a fourth prompt to prompt the user to determine if he wishes to identify or describe the message just stored. If at 652 the system determines that the user does not wish to further identify or describe the message, at 654 a message identification, as described above, is assigned to the message and a text message is sent to the station set 10, 10m, 10r associated with the addressee.

If the user wishes the further identify the message, then (in FIG. 9A), at 656, a fifth prompt is transmitted to determine if the user wishes to enter an originator ID. If, at 660, the system determines that the user will enter an originator ID, at 662 the ID is received and the system looks up text identifying the originator and associated with the entered ID. Most simply, in systems limited to small work groups, all of whom are on the system, the originator ID might be merely the extension of each users associated station set 10, 10m, 10r or the user's password. However, it is within the contemplation of the subject invention and well within the skill of those of ordinary skill in the art to extend the class of users having originator ID's beyond those who are on the system. Thus, while only a small work group within a large corporation might actually be on the system, it would easily be possible for all employees to be assigned ID's and entered in a look-up table.

If at 660 the originating user does not have an ID, a sixth prompt, at 668, instructs the user that he or she may enter a brief message using the DTMF keys of any telephone. A simple code can be used to enter text through the limited keypad of a telephone. For example, one known code enters an "A" by depressing the 2 button once a "B" by pressing it twice and a "C" by pressing it three times Other letters are entered similarly. Such a code, while quite clumsy, would allow users without an ID to at least briefly identify themselves visually if they wished with a name, initials, or keyword.

In either event, at 664 the text is stored. At 672 a seventh prompt prompts the user to determine if the message is urgent. If the message is determined at 674 to be urgent, an appropriate flag is stored at 676 and at 680 an eighth prompt, to determine if the message is a returned message, is transmitted to the user. If the message is not urgent, the system goes directly to 680. Similarly at 682, if the message is determined to be urgent, the appropriate flag is stored at 684 and in either event, at 686 a text message as described above in reference to FIG. 5a, is transmitted at 686 and the system exits.

Returning to FIG. 9, if at 638 the system determines that the user wishes to enter a Callback message, the system goes to 690. As described above, a Callback message is a text message without a necessary associated stored voice signal which simply requests that a call be returned to a specified telephone number. Thus, at 690 a ninth prompt prompts the user to enter the specified telephone number, which is then stored at 692. (Note that it is within the contemplation of the subject invention to use originator ID's to enter telephone number for Callback messages in the manner described with respect to storage of voice signals. In such a case the Callback message could display an alphanumeric identifier of the originator and the number merely be stored at the receiving station set without display. Further, a properly programmed station set code may generate such an output code in response to a designated input signal. At 696 the system prompts the user to enter the latest time at which he can be reached, for example, when he will be leaving the office. As described above, this time will be displayed in the Callback message to avoid wasted calls, and if no latest time is entered the time the Callback message is received will be entered instead. At 700, 702, 704, 706, 710 and 712 the user is prompted and enters control signals defining whether the message is urgent or is a return in the manner described with respect to FIG. 9a. At 713 the system tests to determine if the originator of the Callback message is a known user with the system. If so, a text message to identify the user is looked up at 714 and sent with the text message and the return number is stored in background. If not, at 715 an 11th prompt prompts the user to store a verbal identification at 714, which is stored at 716. The Callback message is then displayed without identification. When the addressee attempts to respond to such a Callback message, the first attempt is responded to by playing back the recorded identification as voice signal as shown in FIG. 8. Only on the second attempt is the return call autodialed.

At 654 the system then sends a digital text message, to the appropriate station set 10, 10m, 10r.

Returning to FIG. 1, it maybe seen that station set 10r is not connected to digital data path 210 and so cannot receive text messages in digital form. However, in accordance with another preferred embodiment of this invention, text messages may be transmitted to station set 10r. Messages for set 10r are not transmitted in real time but are stored, preferably in microcomputer 200. At a convenient time during the day, either station set 10r or voice mail system 300 may initiate an autodial call establishing a telephonic link through PBX 400. Voice mail system 300 may then transmit the stored messages received from microcomputer 200 through PBX 400 to station set 10r by translating the digital data into DTMF codes or other forms of telephone signals such as those generated by modems. Programming of such an embodiment would be a minor matter for a person of ordinary skill in the art and need not be discussed further here for an understanding of the subject invention.

While lacking the real time capability of the subject invention, this embodiment allows text messaging to be transmitted to any station set 10r with the capability to store text messages whether or not such a set can be reached by a digital data path.

The above descriptions of preferred embodiments of the subject invention have been provided by way of illustration only, and those skilled in the art will recognize numerous other embodiments from the Detailed Description given above and the attached Drawing. Thus, limitations on the scope of the claimed invention are to be found only in the claims set forth below.

What is claimed is:

1. Apparatus for storage and retrieval of voice signals, comprising:

(a) a plurality of first input means for input of said voice signals;
(b) a plurality of second input means for input of input control signals associated with said voice signals, said input control signals including addressee identification signals and message description signals;
(c) storage means for storing said voice signals for later retrieval and output;
(d) station means, identified by a particular one of said addressee identification signals, said station means further comprising:
(d1) output means for output of said stored voice signals;
(d2) display means for display of text messages; and
(d3) generating means for generating voice signal retrieval signals;
(e) control means for:
(e1) responding to said input control signals to control said storage means to store said associated voice signals;
(e2) outputting said text messages, said text messages corresponding to said stored voice signals, to said station means for display when said addressee identification signals associated with said stored voice signals identify said station means, said corresponding text messages including information in accordance with said message description signals; and
(e3) responding to said voice signal retrieval signals from said station means to control said storage means to output said associated voice signals to said station means for output; and,
(f) transmission means for;
(f1) transmitting said voice signals from said first input means to said storage means, and said stored voice signals from said storage means to said station means;
(f2) transmitting said input control signals from said second input means to said control means;
(f3) transmitting said text messages from said control means to said station means; and
(f4) transmitting said voice signal retrieval signals from said station means to said control means 2. Apparatus as described in claim 1 wherein said message description signals and said text messages comprise information identifying the originator of said voice signals 3. Apparatus as described in claim 2 wherein said information identifying said originator comprised in said message description signals consists of an identification code and said information identifying said originator comprised in said text message consists of an alphanumeric identifier and wherein said control means includes a predetermined look-up table for matching said identification codes to said alphanumeric identifier.

4. Apparatus as described in claim 3 wherein said control means is further responsive to identification code to also allow a user to access previously stored voice signals 5. Apparatus as described in claim 1 wherein said transmission means further comprises a digital transmission link for transmission of said text messages to said station means.

6. Apparatus as described in claim 1 wherein said text messages are transmitted to said station means through said transmission means in the form of telephone signals.

7. Apparatus as described in claim 6 wherein a telephone connection is established between said station means and said control means for transmission of said text messages.

8. Apparatus as described in claim 7 wherein said transmission means includes a telephone switching system and said text messages are transmitted through said telephone switching system.

9. Apparatus as described in claim 1 wherein said message description signals comprise telephone signals which encode selected alphanumeric characters.

10. Apparatus as described in claim 9 wherein said selected alphanumeric characters are included in said text messages.

11. Apparatus as described in claim 1 wherein said station means further comprises text message storage means for storing a plurality of said text messages, and wherein said display means is responsive to said text message storage means and to text display signals input by a user of said station means to display selected ones of said stored text messages.

12. Apparatus as described in claim 1 wherein said station means further comprises means responsive to said display means and to autodial signals input by a user of said station means to control said means for generating voice signal retrieval signals to generate signals to retrieve the stored voice signals associated with said displayed text messages.

13. Apparatus as described in claim 12 wherein said station means further comprises means for controlling said display means to display an initial summary text message summarizing said text messages stored in said text message storage means.

14. Apparatus as described in claim 13 wherein said display controlling means is further for modifying said initial summary message to indicate when one or more of said stored text messages has been deleted from said text message storage means.

15. Apparatus as described in claim 11 wherein said control means is further for outputting update text messages associated with previously output stored text messages and wherein said station means further includes means for responding to said update text messages to update said stored text messages to indicate changes in the status of said associated stored voice signals.

16. Apparatus as described in claim 15 wherein said update text message indicates that said associated stored voice signals have not been accessed by their intended addressees within a predetermined period since they were stored.

17. Apparatus as described in claim 2 wherein said station means further comprises means responsive to said display means and to autodial signals input by a user of said station means to control said means for generating voice signal retrieval signals to generate signals to retrieve the stored voice signals associated with said displayed text messages.

18. Apparatus as described in claim 1 wherein said station means classifies said text messages into in classes accordance with said message description signals and displays a selected text message from each of said classes of text messages during a first mode of operation, and displays a selected class of said text messages during a second mode of operation.

19. Apparatus a described in claim 18 wherein said display of said selected text messages is sequential in accordance with a predetermined order.

20. Apparatus as described in claim 19 wherein said selected class is displayed by sequentially displaying all text messages in said selected class in reverse chronological order.

21. Apparatus as described in claim 1 wherein said control means is further for outputting callback messages to said station means, each of said callback messages including a telephone number, and wherein said station means further includes means for responding to predetermined user input signals to automatically dial said telephone numbers.

22. Apparatus as described in claim 21 wherein if said callback messages do not visually identify their originators said station means responds to first user input signals to generate particular voice signal retrieval signals; said control means responding to said particular voice signal retrieval signals by vocally identifying said originators, and said station means responding to second user input signals to select and automatically dial said telephone numbers.

23. Apparatus for storage and retrieval of voice signals comprising:
(a) voice mail means for storage and retrieval of said voice signals;
(b) station means connected to said voice mail means for output of stored voice signals, said station means further comprising means for displaying text messages;
(c) means responsive to signals input by originators of said voice signals for transmitting said text messages to said station means, said text messages each corresponding to one of said voice signals;
(d) means responsive to signals input by a user of said station means for selecting a particular one of said text messages for display by said display means;
(e) means responsive to said display means and second signals input by said user of said station means for generating voice signal retrieval signals in accordance with said particular displayed text message and transmitting said voice signal retrieval signals to said voice mail means; and
(f) said voice mail means being further for responding to said voice signal retrieval signals to output the one of said stored voice signals corresponding to said particular displayed text message to said station means.

24. Apparatus as described in claim 23 wherein said text messages include information identifying the originators of associated voice signals.

25. Apparatus as described in claim 24 wherein said signals input by said user of said voice mail means define an identification code for said user and said text messages comprise an alphanumeric identifier of said user, and wherein said voice mail means includes a predetermined look-up table for matching said identification code to said alphanumeric identifier.

26. Apparatus as described in claim 25 wherein said voice mail means is further responsive to said identification code to also allow a user to access previously stored voice signals.

27. Apparatus as described in claim 23 further comprising a digital transmission link for transmission of said text messages to said station means 28. Apparatus as described in claim 23 wherein said text messages are transmitted to said station means in the form of telephone signals.

29. Apparatus as described in claim 28 wherein a telephone connection is established between said station means and said voice mail means for transmission of said text messages.

30. Apparatus as described in claim 29 further comprising a telephone switching system and wherein said text messages are transmitted through said telephone switching system.

31. Apparatus as described in claim 23 wherein said signals input by said user of said voice mail means comprise telephone signals which encode selected alphanumeric characters.

32. Apparatus as described in claim 31 wherein said selected alphanumeric characters are included in said text messages.

33. Apparatus as described in claim 23 wherein said station means further comprises text message storage means for storing a plurality of said text messages, and wherein said display means is responsive to said text message storage means and to text display signals input by a user of said station means to display selected ones of said stored text messages.

34. Apparatus as described in claim 33 wherein said station means further comprises means responsive to said display means and to autodial signals input by a user of said station means to control said means for generating voice signal retrieval signals to generate signals to retrieve the stored voice signals associated with said displayed text messages.

35. Apparatus as described in claim 34 wherein said station means further comprises means for controlling said display means to display an initial summary text message summarizing said text messages stored in said text message storage means.

36. Apparatus as described in claim 35 wherein said display controlling means is further for modifying said initial summary message to indicate when one or more of said stored text messages has been deleted from said text message storage means.

37. Apparatus as described in claim 33 wherein said voice mail means is further for outputting update text messages associated with previously stored text messages and wherein said station means further includes means for responding to said update text messages to update said stored text messages to indicate changes in the status of associated stored voice signals.

38. Apparatus as described in claim 37 wherein said update text messages indicate that said associated stored voice signals have not been accessed by their intended addressees within a predetermined period since they were stored.

39. Apparatus as described in claim 23 wherein said station means classifies said text messages into classes in accordance with the contexts of said text messages and displays a selected text message from each of said classes of text messages during a first mode of operation, and displays a selected class of said text messages during a second mode of operation.

40. Apparatus as described in claim 39 wherein said display of said selected text messages is sequential in accordance with a predetermined order.

41. Apparatus as described in claim 40 wherein said selected class is displayed by sequentially displaying all text messages in said selected class in reverse chronological order.

42. Apparatus as described in claim 23 wherein said voice mail means is further responsive to user input signals to output callback messages to said station means, each of said callback messages including a telephone number, and wherein said station means further includes means for responding to predetermined user input signals to select and automatically dial one of said telephone numbers.

43. Apparatus as described in claim 42 wherein if said callback messages do not identify their originators said station means responds to first user input signals to generate particular voice signal retrieval signals; said voice mail means further responding to said particular voice signal retrieval signals to output voice signals identifying said originators, and said station means responding to second user input signals to select and automatically dial one of said telephone.

44. A method for storage and retrieval of voice signals comprising the steps of:
   (a) receiving voice signals and associated addressee identification signals and associated message description signals at a central location;
   (b) storing said voice signals in accordance with said associated addressee identification signals at said central location;
   (c) identifying station sets in accordance with said associated addressee identification signals and outputting text messages to said identified station sets, said text messages including information in accordance with said associated message description signals.
   (d) selecting particular ones of said text messages for display at said identified station sets;
   (e) outputting voice signal retrieval signals from said identified station sets to said central location, said voice signal retrieval signals identifying particular ones of said stored voice signals in accordance with said displayed text messages; and,
   (f) outputting said identified stored voice signals to said identified station sets in accordance with said voice signal retrieval signals.

45. A method as described in claim 44 wherein said associated message description signals and said text messages comprise information identifying the originators of said voice signals.

46. A method as described in claim 44 comprising the further step of responding to the input of autodial signals input by users of said identified station sets to automatically generate said voice signal retrieval signals.

47. A method as described in claim 44 comprising the further step of outputting updated text messages from said central location to update previously output text messages to reflect changes in the status of said stored voice signals.

48. A method as described in claim 47 wherein said previously output text messages are updated to reflect that voice signals associated with said previously output text messages have not been accessed within a predetermined period of time.

49. In a voice mail system of the type wherein users are provided with a personal identification signal for identification of voice signals input by said users, a method of identifying voice signals belonging to a predetermined class, comprising the steps of:
   (a) providing said users of said system with a common, secondary identification signal which said users may substitute for their personal identification signals prior to input of voice signals;
   (b) responding to input of a voice signal together with said secondary identification signal to store said voice signal for later access by an addressee and associating said stored voice signal with said predetermined class; and
   (c) prior to outputting said stored voice signal to said addressee outputting information to said addressee identifying said stored voice signal as belonging to said predetermined class.

50. A method as described in claim 49, wherein said voice mail system comprises station means for output of said stored voice signal and said station means further comprises display means for display of text, comprising the further step of displaying said output identifying information in textual form at said station means prior to access to said stored voice signal by said addressee.

* * * * *